UNITED STATES PATENT OFFICE.

CHARLES GUY, OF IOLA, KANSAS, ASSIGNOR TO THE PETRIFIC CEMENT COMPANY, OF IOLA, KANSAS.

COMPOSITION OF MATTER TO BE USED AS A CEMENT COMPOUND.

No. 878,382.     Specification of Letters Patent.     Patented Feb. 4, 1908.

Application filed August 12, 1907. Serial No. 388,242.

*To all whom it may concern:*

Be it known that I, CHARLES GUY, a citizen of the United States, residing at Iola, in the county of Allen and State of Kansas, have invented a new and useful Composition of Matter to be used as a Cement Compound, for the Purpose of Making Cement Blocks for Ornamental Purposes, of which the following is a specification.

My composition consists of the following ingredients, combined in the proportions stated, viz.

| Ingredient | Amount |
|---|---|
| Silicate of aluminium, in the form of shale or clay | 40 parts. |
| Magnesium, in the form of talc, steatite, and the like | 38 parts. |
| Sulfate of calcium, in the form of plaster of paris | 5 parts. |
| Calamine | 1 part. |
| Oxid of iron, in the commercial form | 3 parts. |
| Arsenious acid | 1/16 parts. |
| Silicate dioxid, in the form of finely ground sand or quartz | 1/16 parts. |
| Casein | 14/16 parts. |
| Salts of sodium, sodium chlorid, sea salt, and the like | 12 parts. |
| Water | 24 parts. |

All by weight.

The several ingredients are thoroughly mixed and the water added. This mass is placed in suitable molds and let stand for twenty four hours at a temperature of about 80 degrees.

I am aware that silicate of aluminium and calcium sulfate enter the composition of cements. I am also aware that magnesium has been used in some compositions, but I am not aware that all the ingredients of my compound has been used together.

I claim

The herein described composition of matter, consisting of silicate of aluminium, magnesium, sulfate of calcium, calamine, oxid of iron, arsenious acid, silicate dioxid, casein, salts of sodium, and water, substantially as described and for the purpose specified.

CHARLES GUY.

Witnesses:
KATHERINE FOLWELL,
GEO. C. DALGARNO.